US010764898B2

(12) United States Patent
Young et al.

(10) Patent No.: US 10,764,898 B2
(45) Date of Patent: *Sep. 1, 2020

(54) MEDIA ACCESS CONTROL (MAC) ADDRESS IDENTIFICATION (71) Applicant: Bose Corporation, Framingham, MA (US)

(72) Inventors: Douglas W. Young, Arlington, MA (US); Naganagouda B. Patil, Ashland, MA (US); Hiren Harshad Patel, Chelmsford, MA (US); Prateek Gupta, Westborough, MA (US)

(73) Assignee: Bose Corporation, Framingham, MA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/174,970

(22) Filed: Oct. 30, 2018

(65) Prior Publication Data

US 2019/0069287 A1 Feb. 28, 2019

Related U.S. Application Data (63) Continuation of application No. 14/951,015, filed on Nov. 24, 2015, now Pat. No. 10,123,333.

(51) Int. Cl.
*H04W 72/04* (2009.01)
*H04L 29/12* (2006.01)
(Continued)

(52) U.S. Cl.
CPC ........ *H04W 72/048* (2013.01); *G06F 21/313* (2013.01); *G06F 21/43* (2013.01);
(Continued)

(58) Field of Classification Search
CPC ... H04W 72/048; H04W 4/008; H04W 8/005; H04W 8/22; H04W 52/0229;
(Continued)

(56) References Cited

U.S. PATENT DOCUMENTS

2012/0309289 A1 12/2012 Walsh et al.
2013/0145057 A1* 6/2013 Rathi ................. G06F 13/4286
710/38

(Continued)

OTHER PUBLICATIONS

Notice of Allowance; JP Patent Application 2018-545563; dated Jul. 22, 2019.
(Continued)

*Primary Examiner* — Chi Tang P Cheng
(74) *Attorney, Agent, or Firm* — Fish & Richardson P.C.

(57) ABSTRACT

The technology described in this document can be embodied in a method that includes establishing a first wireless communication channel between a first device and a second device. The method also includes accessing, by an application executing on the first device, a transmitter of a first device to transmit to a second device one or more signals configured to cause an occurrence of an event on the second device. The one or more signals are transmitted over a second wireless communication channel between the first device and the second device. The method further includes receiving, from the second device over the first wireless communication channel, information representing a media access control (MAC) address of the first device, and storing, on a storage device accessible by the first device, a representation of the MAC address of the first device. The MAC address is associated with the second wireless communication channel.

27 Claims, 6 Drawing Sheets (51) Int. Cl.
| | |
|---|---|
| *G06F 21/31* | (2013.01) |
| *G06F 21/43* | (2013.01) |
| *H04W 76/19* | (2018.01) |
| *H04W 4/80* | (2018.01) |
| *H04L 29/06* | (2006.01) |
| *H04W 8/22* | (2009.01) |
| *H04W 52/02* | (2009.01) |
| *H04W 8/00* | (2009.01) |
| *H04W 80/02* | (2009.01) |
| *H04W 84/12* | (2009.01) |
| *H04W 84/18* | (2009.01) |

(52) U.S. Cl.
CPC ...... *H04L 61/6022* (2013.01); *H04L 61/6081* (2013.01); *H04L 69/18* (2013.01); *H04W 4/80* (2018.02); *H04W 8/005* (2013.01); *H04W 8/22* (2013.01); *H04W 52/0229* (2013.01); *H04W 76/19* (2018.02); *G06F 2221/2103* (2013.01); *H04W 80/02* (2013.01); *H04W 84/12* (2013.01); *H04W 84/18* (2013.01); *Y02D 70/00* (2018.01); *Y02D 70/144* (2018.01); *Y02D 70/166* (2018.01); *Y02D 70/26* (2018.01)

(58) Field of Classification Search
CPC ... H04W 76/028; H04W 80/02; H04W 84/12; G06F 21/312; G06F 21/43; G06F 2221/2103; H04L 61/6022; H04L 61/6081; H04L 69/18
USPC .......................................................... 370/311
See application file for complete search history.

(56) References Cited

U.S. PATENT DOCUMENTS

| | | | | |
|---|---|---|---|---|
| 2014/0070959 | A1* | 3/2014 | Bhargava | H04Q 9/00 340/870.07 |
| 2014/0364063 | A1 | 12/2014 | Bell | |
| 2015/0123545 | A1 | 5/2015 | Fushimi | |
| 2015/0289299 | A1* | 10/2015 | Abraham | H04L 45/245 370/328 |
| 2015/0350813 | A1* | 12/2015 | Prats | H04W 4/80 709/208 |

OTHER PUBLICATIONS

Apple Inc.'s MFi Program; https://en.wikipedia.org/w/index.php?title=MFi_Program&oldid=688997327 ; Nov. 4, 2015; 3 pp.

International Search Report and Written Opinion; PCT/US2016/062716; dated Mar. 24, 2017; 13 pages.

International Preliminary Report on Patentability; PCT/US2016/062716; dated May 29, 2018; 8 pages.

* cited by examiner

MEDIA ACCESS CONTROL (MAC) ADDRESS IDENTIFICATION

CLAIM OF PRIORITY

This application is a continuation patent application of U.S. patent application Ser. No. 14/951,015, filed on Nov. 24, 2015, the entire contents of which are hereby incorporated by reference.

TECHNICAL FIELD

This disclosure generally relates to wireless devices connected or paired to one another over communication protocols such as Bluetooth® or Bluetooth® Low Energy (BLE).

BACKGROUND

For an application executing on a wireless-enabled device, access to wireless engines such as Bluetooth® or Bluetooth® Low Energy (BLE) engines can be controlled by the operating system of the device. In some cases, where the operating system regulates exposure of an application to media access control (MAC) addresses associated with the wireless engines, the application may not know the MAC address of the device that the application executes on.

SUMMARY

In one aspect, this document features a method that includes establishing a first wireless communication channel between a first device and a second device. The method also includes accessing, by an application executing on the first device, a transmitter of a first device to transmit to a second device one or more signals configured to cause an occurrence of an event on the second device. The one or more signals are transmitted over a second wireless communication channel between the first device and the second device. The method further includes receiving, from the second device over the first wireless communication channel, information representing a media access control (MAC) address of the first device, and storing, on a storage device accessible by the first device, a representation of the MAC address of the first device. The MAC address is associated with the second wireless communication channel.

In another aspect, this document features a method that includes receiving, at a second device, a notification of establishment of a first wireless communication channel with a first device, and receiving, from the first device over a second wireless communication channel different from the first wireless communication channel, one or more signals configured to cause an event on a second device. The method also includes determining that the event matches an expected event, and transmitting, from the second device over the first wireless communication channel and responsive to determining that the event matches the expected event, information representing a media access control (MAC) address of the first device. The MAC address is associated with a second wireless communication channel between the first device and the second device.

In another aspect, this document features a wireless-enabled device that includes a wireless protocol engine, and one or more processing devices. The wireless protocol engine is configured to establish a first wireless communication channel between a first device and a second device. The one or more processing devices are configured to execute an application that accesses a transmitter of a first device to transmit one or more signals configured to cause an occurrence of an event on a second device. The one or more signals are transmitted over a second wireless communication channel between the first device and the second device. The one or more processing devices are also configured to receive, from the second device over the first wireless communication channel and via the wireless protocol engine, information representing a media access control (MAC) address of the first device, and access a storage device to store a representation of the MAC address of the first device. The MAC address is associated with the second wireless communication channel.

In another aspect, this document features a wireless-enabled device that includes a wireless-enabled device and a control engine including one or more processing devices. The wireless protocol engine configured to receive a notification of establishment of a first wireless communication channel with another device, and receive from the another device over a second wireless communication channel different from the first wireless communication channel, one or more signals configured to cause an event on the wireless-enabled device. The control engine is configured to determine that the event matches an expected event, and cause, responsive to determining that the event matches the expected event, a transmission via the wireless protocol engine and over the first wireless communication channel. The transmission includes information representing a media access control (MAC) address of the first device. The MAC address is associated with a second wireless communication channel between the first device and the second device.

Implementations of the above aspects may include one or more of the following features.

The first wireless communication channel can be established in accordance with a first wireless standard, and the second wireless communication channel can be established in accordance with a second wireless standard that is different from the first wireless standard. The first wireless standard can be Bluetooth® Low Energy (BLE) and the second wireless standard can be Bluetooth® Basic Rate/Enhanced Data Rate (BR/EDR). The one or more signals configured to cause an occurrence of an event on the second device may identify the MAC address of the first device to the second device. The one or more signals can be transmitted within a predetermined time window following establishment of the first wireless communication channel. The application can be configured to access the transmitter via an Application Programming Interface (API) that interfaces between the application and an operating system of the first device. Information on a list of one or more MAC addresses can be received from a third device. The MAC address information can correspond to one or more devices that the third device is connected to. The storage device can be accessed to retrieve the MAC address of the first device. Based on determining that the list includes the MAC address of the first device, a determination may be made that the third device is connected to the first device. A representation of the third device can be presented on a user interface of the application executing on the first device.

The first device can be a media player and the second device can be a wireless-enabled audio device. The event can include a change in volume of an acoustic output of the wireless-enabled audio device. The change in volume can be in accordance with a predetermined pattern. A magnitude of change in the volume can be lower than a threshold associated with human perception to changes in acoustic outputs.

The information representing the MAC address of the first device can be transmitted from the second device responsive to receiving the one or more signals within a predetermined time window. The predetermined time window can be calculated from a point at which the second device receives the notification of establishment of the first wireless communication channel with the first device. The MAC address of the first device can be retrieved from a storage location associated with the second device.

Various implementations described herein may provide one or more of the following advantages.

An application executing on a first device may be able to obtain a MAC address of the first device from a second device even when the operating system of the first device restricts direct access to MAC addresses associated with the first device. Consequently, based on information received from a particular connected device, the application may be able to uniquely identify the particular device without having to access the MAC address list regulated by the operating system. This in turn may enable the application to present an identification of the connected device (e.g., via a user interface) to a user, thereby facilitating confirmation/selection of a connected device.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

The development of short range wireless communication protocols (e.g., Bluetooth®) have produced various accessories that can be wirelessly connected to one or more host devices such as a smartphone or tablet computer. Such accessories include, for example, various types of audio devices such as wireless-enabled headsets, earphones, earbuds, hearing aids, personal amplifiers, portable speakers, or other devices for reproducing audio. Such accessories also include various wearable devices such as smart watches, fitness trackers, or health-related sensors (e.g., heart rate sensors, wireless blood oxygenation sensors, ECG sensors, or other sensors used in clinical or non-clinical settings). Other examples of accessory devices can include gaming controllers (that connect to a host gaming console), remote controllers, vehicle audio systems, input/output devices such as keyboards, mice, printers, or display devices, and storage devices such as external hard drives.

In some implementations, it may be desirable to control wireless-enabled accessory devices from a host device. For example, the experience of using Bluetooth® headsets or other Bluetooth® accessories (e.g., speakers, hearing assistance devices, or heart rate sensors) may be improved by providing an application that allows controlling the Bluetooth® devices from a mobile device. In some cases, e.g., where the application on a particular device is used for controlling multiple connected devices, the user may benefit from being able to uniquely identify the various connected devices. The application can provide such a functionality (e.g., by visually presenting a list of one or more connected devices via a user interface) if the application is aware of the MAC addresses associated with both the connected devices and the device on which the application is executing. For example, a particular connected device may send information representing its own MAC address and the MAC address of the device(s) that the particular device is connected to. In such cases, unless the MAC address of the host device (i.e., the device on which the application is executing) is available to the application, the application would not be able to conclusively determine if the particular device is connected to the host device. On the other hand, once the application is aware of the MAC address of the host device, the application is able to identify that the particular device is connected to the host device. Moreover, in cases where a MAC address (e.g., address associated with a Bluetooth® connection) is unique and constant for the corresponding device, storing the MAC address information for the particular device allows the application to uniquely identify the particular device when the device reconnects to the host device.

In some cases, the operating system of the host device may regulate access to the MAC addresses of the devices associated with the host device. This may include the MAC address of the host device itself, as well as the MAC addresses of the devices connected to the host device. In such cases, the application may not have direct access to a MAC address stack of the host device. This in turn can limit the ability of the application executing on the host device to identify the devices connected to the host device. For example, if an operating system of a host device restricts the access of an application to the Bluetooth® address list, the application may not be able to uniquely identify the Bluetooth® devices connected to the host device. In such implementations, the operating system may allow establishment of an auxiliary connection (e.g., a BLE connection) between the host device and another appropriate wireless-enabled device, but the identification of the devices may be randomized to prevent uniquely identifying either device. For example, the operating system may use random resolvable addresses when connecting over BLE, and a connected device therefore may not be able to deterministically resolve whether a Bluetooth® connection and a BLE connection are with the same host device.

The technology described herein allows an application executing on a host device to form an auxiliary connection with an already-connected device, and correlate the existing connection with the auxiliary connection within a predetermined time window of forming the auxiliary connection. Such time-based correlation allows the host device to uniquely identify a connected device. The connected device is aware of the MAC address of the host device, and can be configured to send information about that MAC address to the application. Because the time-based correlation allows the application to uniquely identify the connected device as one that is connected to the host device, the application can thus determine the received MAC address as that of the host device. Once the application has information about the MAC address of the host device, the application may identify, based on information received from various connected devices, the unique MAC addresses of the corresponding connected devices, and store information about such MAC addresses. In some implementations, this allows the application to uniquely identify a device when the device reconnects to the host device.

The accessory devices may be interchangeably referred to herein as secondary devices, while the host devices (e.g., the devices that the accessory devices connect to, and the device the application executes on) may be interchangeably referred to as primary devices. Examples of host devices can include mobile devices such as cellular phones, smartphones, tablet devices, or e-readers. Examples of host devices can also include gaming consoles, media streaming devices, audio systems, or computing devices such as laptop or desktop computers.

In some implementations, the devices provided as examples of secondary devices may also act as a host or primary device. As such, whether a particular device is a primary or secondary device can depend on the nature of the wireless connection. One device that acts as the primary device for one connection may act as a secondary device for another connection. For example, a smartphone can act as a host device for a connection with a wireless-enabled headset, but as a secondary device for a connection with a gaming console (e.g., for being used as a controller for the gaming console). In some implementations, two devices in a wireless connection can be substantially equivalent, and can be interchangeably treated as a host device or secondary device. In some implementations, a device that is a secondary device for one connection can act as a host device for another connection. For example, a wireless-enabled headset may act as a host device in connecting with secondary devices such as a wearable smartwatch, or vice versa.

This document describes connections between host devices and secondary devices primarily using examples of Bluetooth® Basic Rate/Enhanced Data Rate (BR/EDR) and Bluetooth® Low Energy (BLE) connections. For brevity, Bluetooth® Basic Rate/Enhanced Data Rate (BR/EDR) may be interchangeably referred to as classic Bluetooth® (CBT) or simply Bluetooth®. While the examples herein are primarily based on Bluetooth® and BLE, other communication protocols (e.g., Near Field Communications (NFC), IEEE 802.1, or other local area network (LAN) or personal area network (PAN) protocols for which access to MAC addresses are regulated by corresponding operating systems) are within the scope of the technology described herein. Also, setting up a connection between two devices is interchangeably referred to in this document as a pairing. However, the technology may be applied to non-Bluetooth® devices and their connections without deviating from the scope of the disclosure. As such, the term "pairing," as used in this document, is intended to include a pairing-and-connecting process for Bluetooth® devices, a connecting process for BLE devices, and other processes for establishing communication channels between wireless-enabled devices in accordance with corresponding wireless standards.

Figure 1:
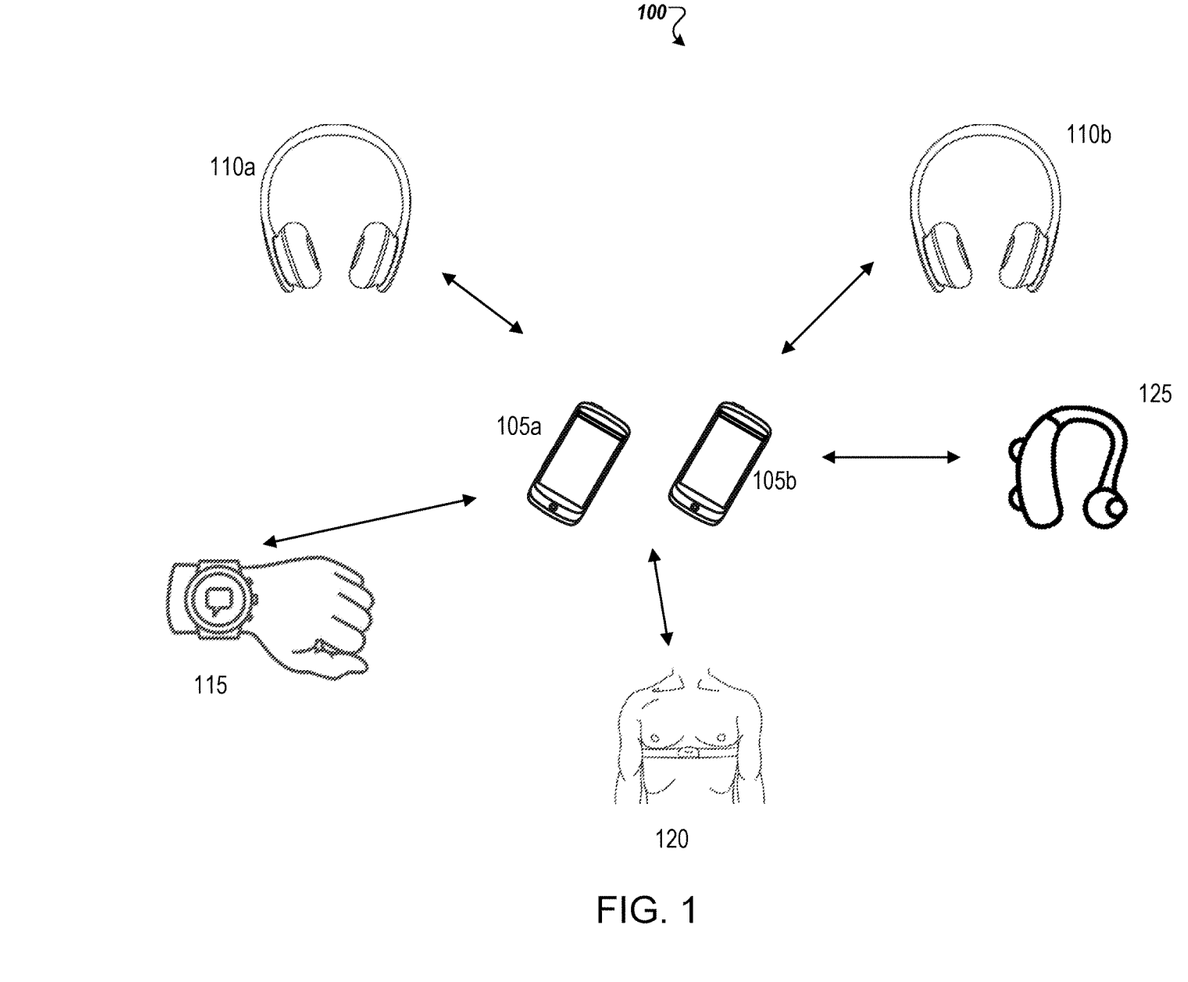
FIG. 1 is a diagram showing an example of an environment including multiple accessories or secondary devices together with one or more host devices.

In some situations, a wireless environment may include multiple secondary devices that are available for pairing with one or more host devices. An example of such an environment 100 is shown in FIG. 1. The example environment 100 includes multiple host devices 105a, 105b (105, in general) and multiple accessory or secondary devices. The secondary devices can include, for example, multiple headsets 110a and 110b (110, in general), smartwatches 115, heart rate sensors 120, and hearing assistance devices 125. Such a situation can occur, for example, where individuals may have wireless-enabled devices connectable to respective phones 105 over Bluetooth®. In such a situation, a person attempting to pair a device to a phone 105 may be presented with a list of multiple available devices on an interface provided by the operating system of the phone. However, for a third-party application executing on the phone 105, displaying such a list would depend on whether the operating system of the phone allows the application to access the MAC address list associated with the phone 105.

In situations, where the operating system restricts access to the MAC address list, the application executing on a particular phone 105a does not have access to information about the Bluetooth® address of the phone 105a, and accordingly cannot identify a connected device uniquely. For example, if the headset 110a knows the unique Bluetooth® address of the phone that the headset 110a is connected to, the headset 110a may be able to send the information to the application executing on the phone 105a (e.g., via an auxiliary connection such as a BLE connection). However, if the application does not have information on the Bluetooth® address of the phone 105a, the application cannot conclusively determine whether the headset 110a is connected to the phone 105a. In the particular example of FIG. 1, without information on the Bluetooth® address of the phone 105a, the application would not be able to conclusively determine if the Bluetooth® address information received from the headset 110a corresponds to the Bluetooth® address of the phone 105a, or another device (e.g., the phone 105b or watch 115) that the headset 110a is connected to.

When a host device (e.g., a smartphone 105) establishes a primary connection (e.g., a Bluetooth® connection) with a secondary device (e.g., a wireless-enabled headset 110), the MAC address (e.g., the Bluetooth® address) of the host device is made available to the secondary device. However, the secondary device cannot send information about the MAC address directly to an application that executes on the host device but does not have access to the MAC address list on the host device. By using the technology described in this document, the application can be configured to establish an auxiliary connection (e.g., a BLE connection) and send a predetermined signal over the primary connection (e.g., a Bluetooth® connection) to the secondary device within a predetermined time period of establishing the auxiliary connection. If the secondary device receives the predetermined signal within the predetermined time window of establishment of the auxiliary connection, the secondary device can be configured to identify that the primary connection and the secondary connection are both with the same device. Upon such identification, the secondary device can be configured to send information representing the MAC address (e.g., Bluetooth® address) of the host device to the application over the auxiliary connection. This is described next using an example in which the primary connection is a Bluetooth® connection and the auxiliary connection is a BLE connection.

Figure 2:
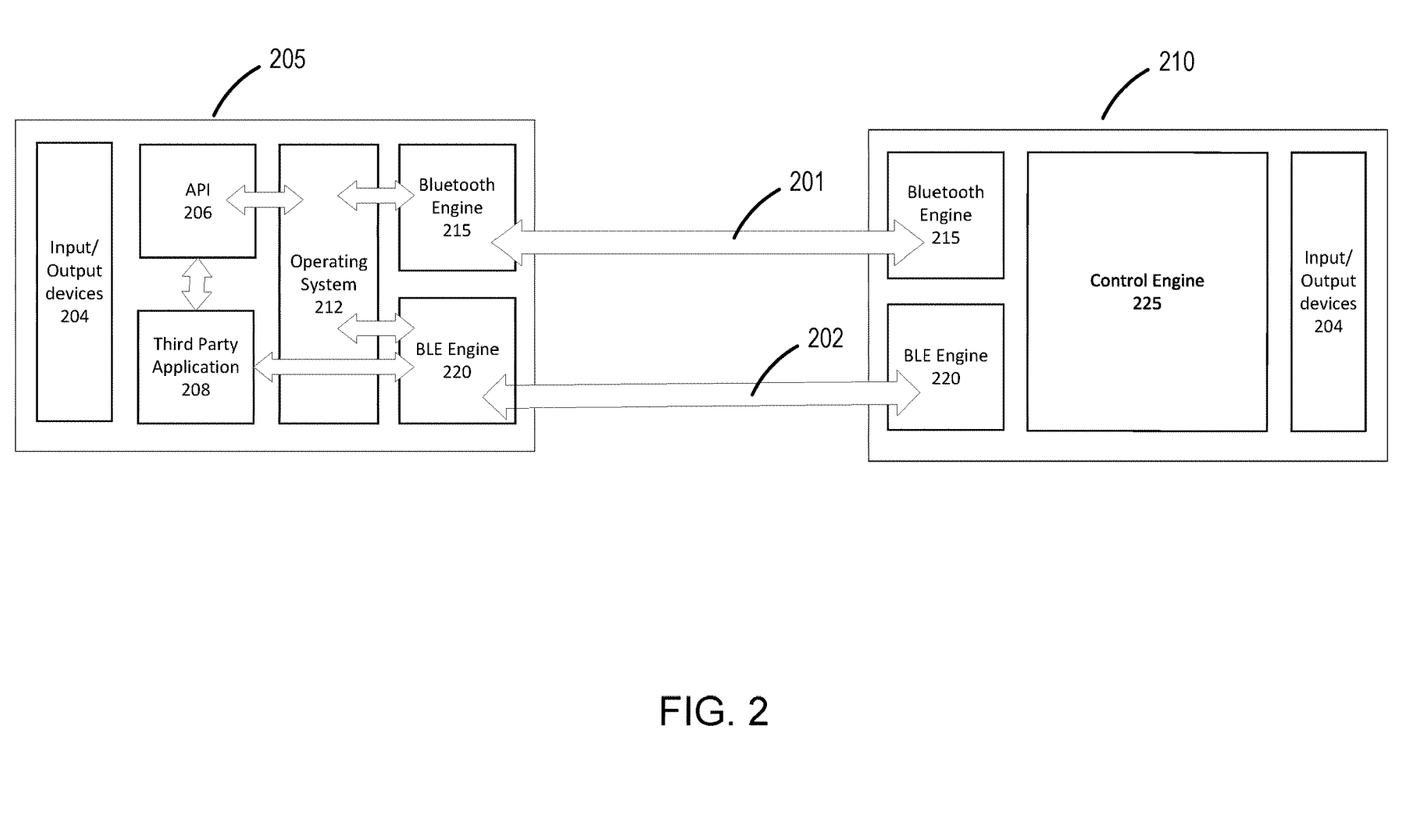
FIG. 2 shows block diagrams of a host device and a secondary device.

FIG. 2 shows block diagrams of a host device 205 and a secondary device 210 that are paired with one another, or attempting to pair with one another. In some implementations, each of the host device 205 and the secondary or accessory device 210 can include one or more input/output devices 204, and one or more wireless protocol engines such the Bluetooth® engine 215 and BLE engine 220. A third party application 208 that controls one or more operations of the secondary device 210 can be configured to execute on the host device 205. For example, if the host device is a smartphone and the secondary device is a wireless-enabled headset, the manufacturer of the headset may provide the third-party application 208 for enabling control of the headset using the smartphone. A user of the smartphone may be able to download the application 208 from an online repository, or otherwise install the application 208 on the smartphone. The application 208 may be able to communicate with an operating system 212 of the host device 205 via an application programming interface (API) 206. In some implementations, the application 208 may also be able to communicate with one or more other engines, modules, or devices directly or via an API 206. At least portions of such communications may be routed through the operating system 212.

The secondary device 210 can include one or more input/output devices 204, and one or more wireless protocol engines such the Bluetooth® engine 215 and BLE engine 220. The secondary device 210 can also include a control engine 225 that controls the operations of the various other engines, modules, or units of the secondary device 210. For example, the control engine 225 can be configured to interface between the input/output devices (e.g., speakers) 204 and a wireless protocol engine such as the Bluetooth® engine 215 to produce output (e.g., audio) from the input/output devices 204.

The host device 205 and the secondary device 210 can be configured to cooperate with one another to establish one or more wireless communication channels. In some implementations, where the host device 205 and the secondary device 210 are Bluetooth® devices, the Bluetooth® engines 215 of the two devices are configured to establish a primary communication channel 201 between the two devices via a pairing-and-connecting process. Upon establishment of such a connection, the Bluetooth® engine of the host device 205 communicates the MAC address (Bluetooth® address, in this example) of the host device 205 to the secondary device 210. However, the operating system 212 may regulate access of the third-party application 208 to the Bluetooth® engine 215 of the host device 205 in a way that the application 208 is unable to obtain the MAC address of the host device.

In some implementations, the host device 205 and the secondary device 210 may establish an auxiliary communication channel 202 between the two devices. In the example of FIG. 2, the auxiliary communication channel 202 is a BLE channel which may be established by the BLE engines 220 of the corresponding devices using a connecting process. In some implementations, the auxiliary communication channel 202 can be a low bandwidth channel that facilitates exchange of identification information, but does not support high bit rate data that may be exchanged between the devices, for example, over the higher bandwidth primary communication channel 201. The identification information can include, for example, MAC addresses of the devices (e.g., Bluetooth® or BLE addresses associated with the devices).

In some implementations, the Bluetooth® pairing and connecting process and/or the BLE connecting process may be initiated, for example, directly via the operating system 212 of the host device 205, or using the application 208 that communicates with the operating system 212 via the API 206 to initiate the Bluetooth® pairing process. The process of establishment of the primary communication channel 201 may include a Bluetooth® inquiry scan or page scan. During such a scan, the Bluetooth® engine 215 (which may also be referred to as a Bluetooth® stack) of the host device 205 can be in an "inquiry" mode to detect other Bluetooth® devices in the vicinity. The Bluetooth® engine 215 of the secondary device 210 can be in an "inquiry scan" mode to detect inquiries from other devices and respond accordingly. Once a host device identifies or discovers other available devices in the vicinity, the primary connection 201 can be established with one or more of the discovered devices, for example, automatically or responsive to user input indicative of instructions to pair with a particular device.

In some implementations, the input/output devices 204 can include, for example, a display configured to present a user interface that includes a list of accessory or secondary devices 210 paired with the host device 205. In some implementations, the user interface can be provided by the third-party application 208. In such cases, the application 208 can be configured to uniquely identify the one or more secondary devices 210 connected to the host device 205. In some implementations, identification of the secondary devices can be performed using a process as represented using the state diagrams in FIGS. 3A and 3B.

Figure 3A:
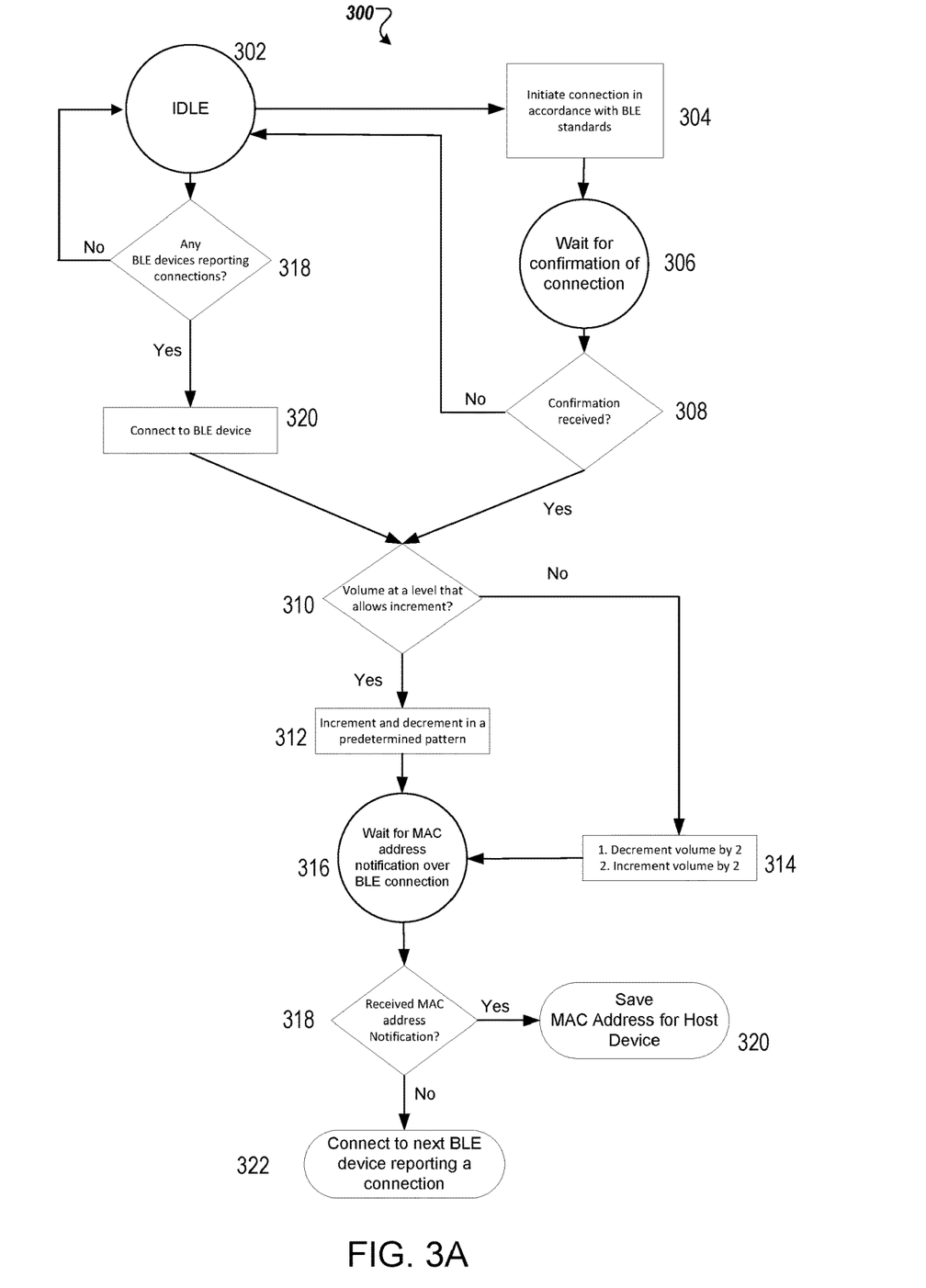
FIGS. 3A and 3B show state diagrams associated with the technology described herein.

The state diagram 300 depicted in FIG. 3A illustrates an example sequence of states of an application executing on a host device that is already connected to a secondary device by a primary connection. Specifically, the example of FIG. 3A describes the sequence of states of an application 208 that obtains the Bluetooth® address (as the MAC address of the primary connection) of the host device by establishing a BLE connection as the auxiliary connection. In some implementations, the application can be in an idle state 302 prior to initiating a connection (304) with a secondary device in accordance with BLE standards. In the state 304, the application 208 can be configured to access a BLE engine 220 of the host device to initiate the connection. In some implementations, the application 208 may access the BLE engine 220 via the operating system 212 of the host device.

Upon initiating the BLE connection, the application can be configured to wait for a confirmation of the connection (306). In some implementations, a check for the receipt of the confirmation can be performed (308), for example, periodically during a predetermined window of time. In some implementations, if the confirmation is not received within the predetermined window of time (e.g., within 3 seconds or less), the application can be configured to determine connection failure and move to the idle state 302.

On the other hand, upon receiving confirmation of establishment of a BLE connection within the predetermined window of time, the application 208 can be configured to initiate transmission of one or more signals over the primary connection (Bluetooth®, in this case), such that the one or more signals cause an occurrence of a predetermined event at the secondary device. This can be done, for example, via accessing the Bluetooth® engine 215 of the host device. The transmission of the one or more signals can be initiated such that the signals are transmitted over the primary connection within a predetermined time window (e.g., 500 ms) of receiving the confirmation of connection establishment. In some implementations, where the secondary device is a device capable of producing an audio output, the event can be a predetermined pattern of volume change. In some implementations, the event can be one that is imperceptible or non-intrusive to a user of the secondary device. For example, if the secondary device is a headset (or another audio device), the event can be a volume change that is imperceptible or barely perceptible by a user of the headset. For example, a magnitude of change in the volume can be lower than a threshold associated with human perception to changes in acoustic outputs.

In one example, initiating transmission of the one or more signals can include checking if the volume of the secondary device is at a level that allows for additional increment according to the predetermined pattern (310). If the current level of volume allows for such an increment, the application 208 may initiate transmission of one or more signals that increments, and then optionally decrements, the volume in the predetermined pattern (312). For example, for a volume range that allows for 128 discrete levels (e.g., 0-127), the one or more signals can be caused to increment the volume by 1 or 2 levels (and optionally decrement the volume, for example, by the same number of levels to bring the volume level back to the original level). On the other hand, if the current level of volume does not allow for an increment according to the predetermined pattern, the application 208 may initiate transmission of one or more signals that decrements, and then optionally increments, the volume in accordance with another predetermined pattern (314). For example, the one or more signals can be caused to decrement the volume by 1 or 2 levels (and then optionally increment the volume, for example, by the same number of levels to bring the volume level back to the original level). Such small changes, when implemented at the secondary device, may be barely perceptible, if at all, to the user of the secondary device.

When in the idle state 302, the application can also be configured to check if any BLE devices are reporting connections (318). Upon determining that one or more BLE devices are reporting connections, the application can be configured to connect to the BLE device (320) by accessing the BLE engine 220 of the host device. In some implementations, when multiple BLE devices are reporting connections, the application can be configured to select a secondary device to connect to. Such selection can be done, for example, based on received signal strength indicators (RSSI) associated with the multiple secondary devices. In some implementations, the application 208 can be configured to initiate transmission of the one or more signals over the primary Bluetooth® connection such that the one or more signals cause an occurrence of the predetermined event at the secondary device within a predetermined time window of connecting to a BLE device. For example, the transmission can be initiated within 500 ms or less of connecting to the BLE device.

Upon transmission of the one or more signals over the primary connection, the application can be configured to wait for a MAC address notification over the BLE connection (316). A secondary device, upon receiving the signals, determines whether the signals received over the primary connection are received within the predetermined time window after establishment of the auxiliary BLE connection. Only upon determining that the signals are received within the predetermined time window, the secondary device determines the correlation that the primary and auxiliary connections are from the same host device. Upon determining the correlation, the secondary device transmits information about the MAC address (associated with the primary connection) of the host device over the auxiliary BLE connection.

The application 208 can be configured to check if such MAC address information is received over the auxiliary BLE connection (318). If such information is received, the application can determine that the secondary device currently connected with the host device over the auxiliary BLE connection is also the device that is connected to the host device over the primary Bluetooth® connection. Therefore, the application determines the received MAC address information to be the Bluetooth® address of the host device, and saves the information on a storage device for later access (320). On the other hand, if the application does not detect receipt of any MAC address information, the application can determine that the secondary device currently connected with the host device over the auxiliary BLE connection is different from the device that is connected to the host device over the primary Bluetooth® connection. Accordingly, the application may disconnect the BLE connection with the secondary device, and proceed to connect with another BLE device that may be available (322). This can continue, for example, until the MAC address information is received from a secondary device, or all available BLE devices are checked.

Figure 3B:
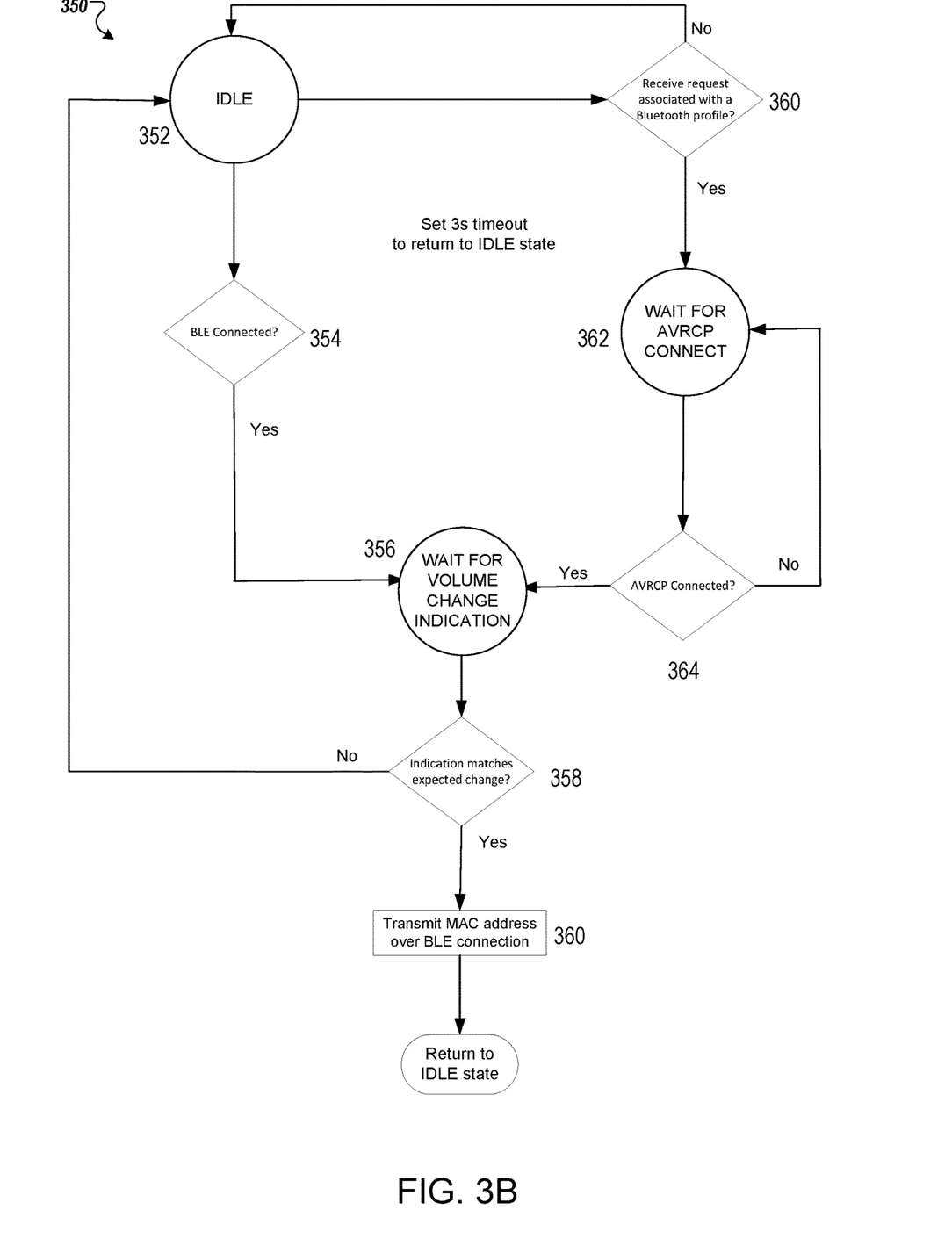

The state diagram 350 depicted in FIG. 3B illustrates an example sequence of states of a secondary device. Specifically, the example of FIG. 3B describes the sequence of states at a Bluetooth® headset that provides the Bluetooth® address of the host device over an auxiliary a BLE connection. In some implementations, the secondary device is initially in an idle state 352. In some implementations, the secondary device, which may already be connected to a host device over a primary Bluetooth® connection, checks for a notification of establishment of an auxiliary BLE connection (354). Upon receiving such a notification, the secondary device enters a state 356 in which the secondary device waits for one or more signals from the host device over the primary Bluetooth® communication channel. In this particular example, the one or more signals can be indicative of a volume change. The secondary device can be configured to wait for the one or more signals for a predetermined window of time following the receipt of the notification of establishment of the auxiliary BLE connection. For example, if the one or more signals are not received within 500 ms of the receipt of the notification of establishment of the auxiliary BLE connection, the secondary device can be configured to return to the idle state 352.

Upon receiving the one more signals, the secondary device can be configured to check if the volume change indicated by the one or more signals matches a predetermined or expected pattern of volume change (358). If the volume change indicated by the one or more signals is not indicative of the expected change, the secondary device can be configured to revert to the idle state 352. On the other hand, if the volume change indicated by the one or more signals (received within the predetermined time window) match the expected pattern of volume change (e.g., one or more levels of increments and/or decrements as described above with reference to FIG. 3A), the secondary device can determine that the auxiliary BLE connection and the primary Bluetooth® connection are with the same device. Upon such a determination, the secondary device can be configured to send information about the MAC address (Bluetooth® address in this example) associated with the primary connection using a notification over the auxiliary BLE connection (360). This can be done, for example, by the control engine 225 of the secondary device 210 (in FIG. 2) in conjunction with the BLE engine 220 of the secondary device.

In some implementations, in order to receive the one or more signals over the primary Bluetooth® connection, the secondary device checks for whether a request associated with a Bluetooth® profile has been received (360). Upon receiving such a request, the secondary device enters a state in which the secondary device waits for a connection in accordance with a Bluetooth® profile (362). In some implementations, the Bluetooth® profile can be Audio/Video Remote Control Profile (AVRCP) that a host device can use for sending volume control instructions. The secondary device can also be configured to check for a successful connection under the AVRCP profile (364). Upon a successful AVRCP connection, the secondary device can move into the state 356 (as described above), to wait for receiving the one or more signals indicative of a volume change.

Figure 4:
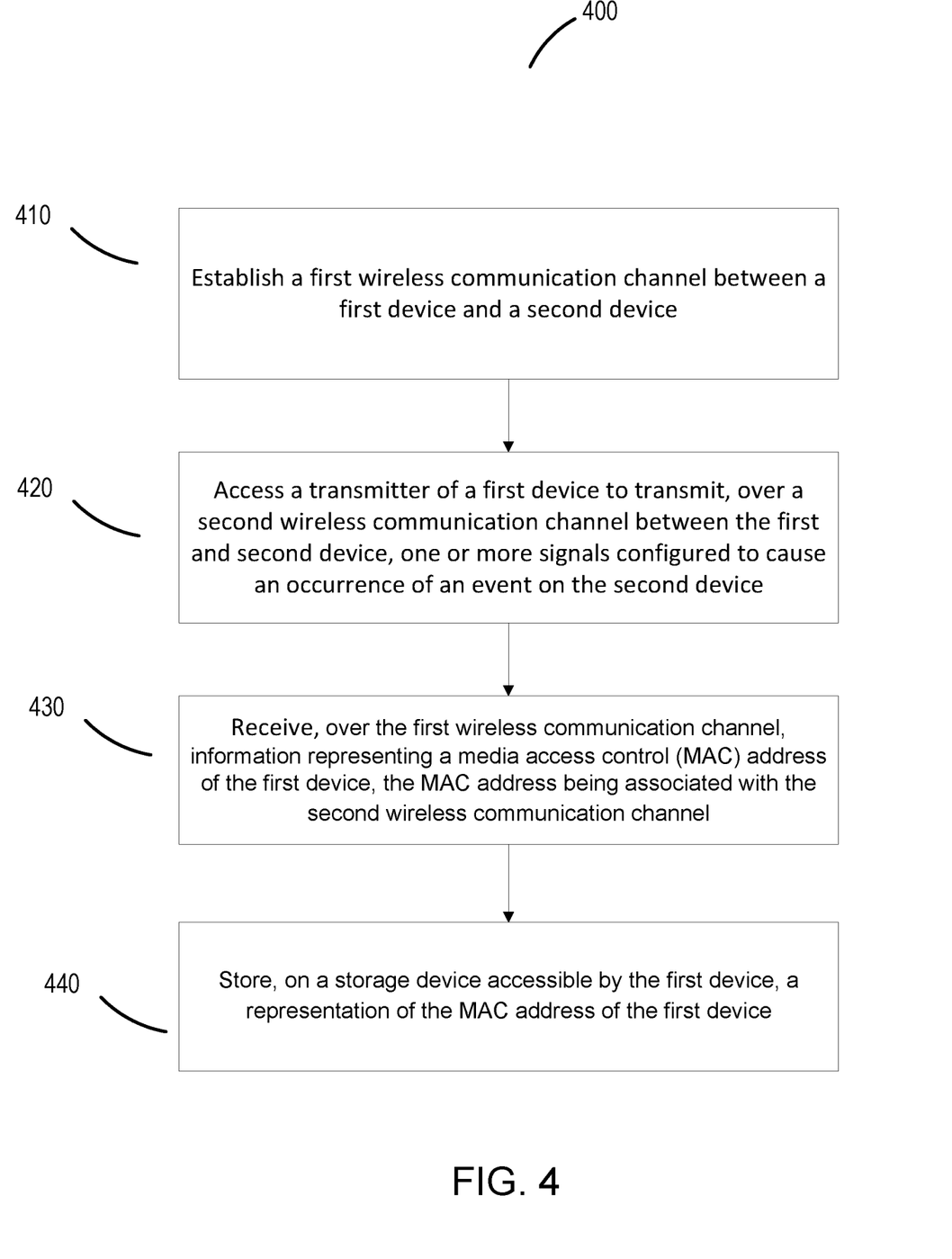
FIG. 4 is a flowchart of an example process for obtaining a MAC address of a device.

FIG. 4 shows a flowchart of an example process 400 for obtaining a MAC address of a device. The process 400 can be implemented, at least in part, by an application (e.g., the third-party application 208 described with reference to FIG. 2) executing on one or more processors of a host device. The operations of the process 400 includes establishing a first wireless communication channel between a first device and a second device (410). In some implementations, the first device is a host device (e.g., a smartphone or a media player) and the second device is a secondary or accessory device (e.g., a wireless-enabled audio device such as a headset).

The operations of the process 400 also includes accessing, by an application executing on the first device, a transmitter of a first device to transmit over a second wireless communication channel between the first device and a second device, one or more signals configured to cause an occurrence of an event on the second device (420). In some implementations, the transmitter can be associated with a Bluetooth® engine 215 described above with reference to FIG. 2. The first wireless communication channel can be established in accordance with a first wireless standard (e.g., BLE), and the second wireless communication channel can be established in accordance with a second wireless standard (e.g., Bluetooth® Basic Rate/Enhanced Data Rate (BR/EDR)) that is different from the first wireless standard. The one or more signals can be transmitted, for example, within a predetermined time window (e.g., 500 ms or less) following establishment of the first wireless communication channel. The application can be configured to access the transmitter via an operating system of the device on which the application executes. The access may be facilitated by an API interfacing between the application and the operating system. The event can include, for example, a predetermined pattern of volume increments and decrements such as the patterns described above with reference to FIG. 3A. In some implementations, a media file (e.g., a music track or a silent track) can be played on the host device to ensure that the volume change notifications are interpreted by the secondary device as valid signals.

Operations of the process 400 further includes receiving, over the first wireless communication channel, information representing a media access control (MAC) address of the first device, the MAC address being associated with the second wireless communication channel (430). For example, the MAC address can be the host device Bluetooth® address that is otherwise unavailable to the application due to regulations imposed by the operating system of the host device. The operations also include storing, on a storage device accessible by the first device, a representation of the MAC address of the first device. The storage device can be local to the host device, or at a remote location accessible to the host device over a network.

Once the MAC address of the host device is obtained and saved, the first device (or the host device) can be configured to identify the MAC addresses of other devices connected to the host device. For example, a third device may send to the host device information on a list of one or more MAC addresses, which includes the MAC address of the third device and the MAC addresses of one or more devices that the third device is connected to. By retrieving its own MAC address from the storage location, the host device can be configured to determine that the third device is connected to the host device. The identified MAC address of the third device can also be stored, such that the device can be readily identified when the device reconnects to the host device. In some implementations, an identified device can be presented by the application on a user-interface presented on a display device of the host device. In some implementations, the process 400 can be executed only upon determining that the application has not obtained (or does not have access to) the MAC address of the host device on which the application executes.

Figure 5:
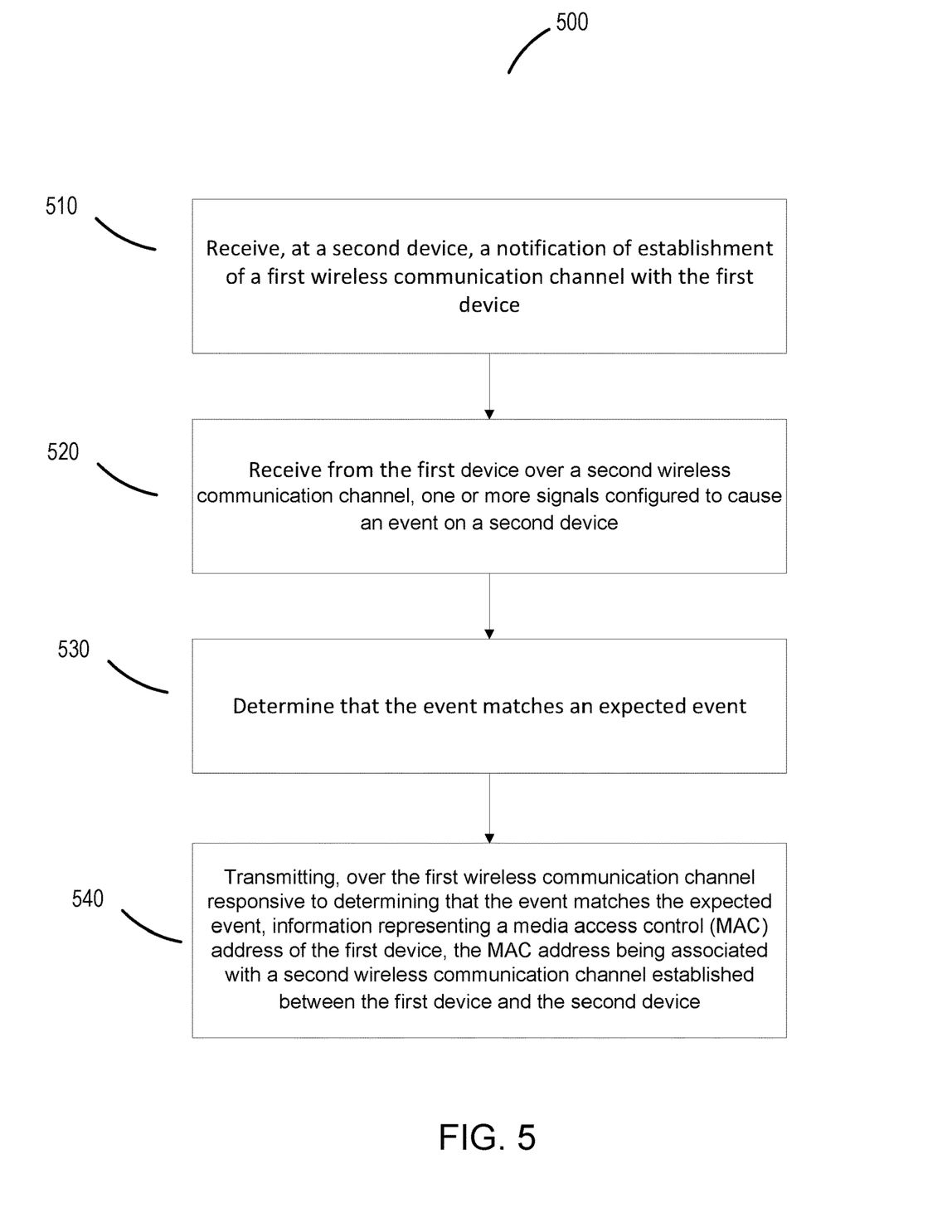
FIG. 5 is a flowchart of an example process for transmitting MAC address information of a host device.

FIG. 5 shows a flowchart of an example process 500 for transmitting a MAC address of a device. The process 500 can be implemented, at least in part, on a secondary device (e.g., a wireless-enabled headset) that is connected to a host device over a primary connection. The secondary device may become aware of the MAC address (associated with the primary connection) of the host device during establishment of the primary connection, and thereafter implement the process 500 for providing information about the MAC address of the host device to an application executing on the host device. For example, at least a portion of the process 500 can be executed by a control engine 225 of a secondary device 210 as described with reference to FIG. 2. The operations of the process 500 includes, for example, receiving at a second device, a notification of establishment of a first wireless communication channel with the first device (510). The second device can be the secondary or accessory device (e.g., a wireless-enabled audio device such as a headset), and the first device can be the host device (e.g., a media player or a smartphone). The first wireless communication channel can be established in accordance with BLE standards.

The operations of the process 500 can also include receiving from the first device over a second wireless communication channel, one or more signals configured to cause an event on a second device (520). The second wireless communication channel can be different from the first wireless channel. For example, the second wireless channel may be established in accordance with Bluetooth® standards. The operations of the process 500 can also include determining that the event caused by the one or more signals matches an expected event (530). For example, if the one or more signals are configured to cause a volume change in the secondary device, a determination may be made whether the volume change is in accordance with a predetermined pattern of volume change associated with the expected event. If the volume change caused by the one or more signals matches the predetermined pattern of volume change, the expected event may be determined to have occurred. In some implementations, the one or more signals may be used in determining whether an expected event has occurred only if the one or more signals are received within a predetermined time window of establishment of the first wireless communication channel. In some implementations, the one or more signals may identify the MAC address of the first device to the second device.

The operations of the process 500 further includes transmitting, from the second device over the first wireless communication channel and responsive to determining that the event matches the expected event, information representing a media access control (MAC) address of the first device (540). The MAC address can be associated with a second wireless communication channel between the first device and the second device. For example, the MAC address can be the Bluetooth® address of the host device. The information representing the MAC address of the first device can be transmitted from the second device responsive to receiving the one or more signals within a predetermined time window (e.g., 500 ms or less). Such a predetermined time window can be calculated, for example, from a point at which the second device receives the notification of establishment of the first wireless communication channel with the first device. The MAC address of the host device can be retrieved from a storage device associated with the secondary device.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

In some implementations, an API (e.g., a RESTful API with JSON/XML output) and/or an embeddable plug-in, can be configured to allow third-party websites and applications to interact with an operating system and/or one or more wireless protocol engines such as a Bluetooth® engine or a BLE engine.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of processes described herein. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method comprising:
    establishing a first wireless communication channel between a first device and a second device;
    transmitting, by an application executing on the first device using a transmitter of the first device, over a second wireless communication channel between the first device and the second device, one or more signals configured to trigger an occurrence of an event on the second device, wherein the event comprises a predetermined change in an output of the second device;
    receiving, from the second device over the first wireless communication channel, a media access control (MAC) address of the first device, the MAC address being associated with the second wireless communication channel, wherein the MAC address of the first device is transmitted from the second device responsive to the second device receiving the one or more signals within a predetermined time window following establishment of the first wireless communication channel; and
    storing, on a storage device accessible by the first device, the MAC address of the first device, wherein the stored MAC address is accessible by the application executing on the first device.

2. The method of claim 1, wherein the first wireless communication channel is established in accordance with a first wireless standard, and the second wireless communication channel is established in accordance with a second wireless standard that is different from the first wireless standard.

3. The method of claim 2, wherein the first wireless standard is Bluetooth® Low Energy (BLE) and the second wireless standard is Bluetooth® Basic Rate/Enhanced Data Rate (BR/EDR).

4. The method of claim 1, wherein the one or more signals configured to cause an occurrence of an event on the second device identifies the MAC address of the first device to the second device.

5. The method of claim 1, wherein the one or more signals are transmitted within a predetermined time window following establishment of the first wireless communication channel.

6. The method of claim 1, wherein the application is configured to transmit the one or more signals by accessing the transmitter via an Application Programming Interface (API) that interfaces between the application and an operating system of the first device.

7. The method of claim 1, further comprising:
    receiving, from a third device, information on a list of one or more MAC addresses corresponding to one or more devices that the third device is connected to;
    accessing the storage device to retrieve the MAC address of the first device; and
    determining that the third device is connected to the first device based on determining that the list includes the MAC address of the first device.

8. The method of claim 7, further comprising:
    presenting a representation of the third device on a user interface of the application executing on the first device.

9. The method of claim 1, wherein the predetermined change comprises a change in volume of an audio output at the second device.

10. A method comprising:
    receiving, at a second device, a notification of establishment of a first wireless communication channel with a first device;
    receiving, from the first device over a second wireless communication channel different from the first wireless communication channel, one or more signals configured to trigger an occurrence of an event on the second device, wherein the event comprises a predetermined change in an output of the second device;
    determining that the event matches an expected change in the output of the second device; and
    transmitting, from the second device over the first wireless communication channel and responsive to determining that the event matches the expected change in the output of the second device, a media access control (MAC) address of the first device, the MAC address being associated with the second wireless communication channel between the first device and the second device, wherein the MAC address of the first device is transmitted from the second device responsive to the second device receiving the one or more signals within a predetermined time window following establishment of the first wireless communication channel.

11. The method of claim 10, wherein the predetermined time window is calculated from a point at which the second device receives the notification of the establishment of the first wireless communication channel.

12. The method of claim 10, wherein the first wireless communication channel is established in accordance with a first wireless standard, and the second wireless communication channel is established in accordance with a second wireless standard that is different from the first wireless standard.

13. The method of claim 12, wherein the first wireless standard is Bluetooth® Low Energy (BLE) and the second wireless standard is Bluetooth® Basic Rate/Enhanced Data Rate (BR/EDR).

14. The method of claim 10, wherein the one or more signals configured to cause an occurrence of an event on the second device identifies the MAC address of the first device to the second device.

15. The method of claim 10, further comprising:
retrieving the MAC address of the first device from a storage location associated with the second device.

16. The method of claim 10, wherein the predetermined change comprises a change in volume of an audio output at the second device.

17. A wireless-enabled device comprising:
memory;
a wireless protocol engine configured to establish a first wireless communication channel between the wireless-enabled device and a second device; and
one or more processing devices configured to:
execute an application that transmits, using a transmitter of a first device, over a second wireless communication channel between the wireless-enabled device and the second device, one or more signals configured to trigger an occurrence of an event on the second device, wherein the event comprises a predetermined change in an output of the second device,
receive, from the second device over the first wireless communication channel and via the wireless protocol engine, a media access control (MAC) address of the first device, the MAC address being associated with the second wireless communication channel, wherein the MAC address of the first device is transmitted from the second device responsive to the second device receiving the one or more signals within a predetermined time window following establishment of the first wireless communication channel, and
store, on a storage device, the MAC address of the first device, wherein the stored MAC address is accessible by the application executing on the wireless-enabled device.

18. The device of claim 17, wherein the first wireless communication channel is established in accordance with a first wireless standard, and the second wireless communication channel is established in accordance with a second wireless standard that is different from the first wireless standard.

19. The device of claim 18, wherein the first wireless standard is Bluetooth® Low Energy (BLE) and the second wireless standard is Bluetooth® Basic Rate/Enhanced Data Rate (BR/EDR).

20. The device of claim 17, wherein the application is configured to transmit the one or more signals by accessing the transmitter via an Application Programming Interface (API) that interfaces between the application and an operating system of the wireless-enabled device.

21. The device of claim 17, wherein the one or more processing devices are further configured to:
receive, from a third device, information on a list of one or more MAC addresses corresponding to one or more devices that the third device is connected to;
access the storage device to retrieve the MAC address of the wireless-enabled device; and
determine that the third device is connected to the wireless-enabled device based on determining that the list includes the MAC address of the wireless-enabled device.

22. The device of claim 21, wherein the one or more processing devices are configured to:
present a representation of the third device on a user interface of the application executing on the wireless-enabled device.

23. The wireless-enabled device of claim 17, wherein the predetermined change comprises a change in volume of an audio output at the second device.

24. A wireless-enabled device comprising:
memory;
a wireless protocol engine configured to:
receive a notification of establishment of a first wireless communication channel with a remote device, and
receive from the remote device over a second wireless communication channel different from the first wireless communication channel, one or more signals configured to trigger an occurrence of an event on the wireless-enabled device, wherein the event comprises a predetermined change in an output of the wireless-enabled device; and
a control engine comprising one or more processing devices, the control engine configured to:
determine that the event matches an expected change in an output of the wireless-enabled device, and
transmit, responsive to determining that the event matches the expected change in the output of the wireless-enabled device, via the wireless protocol engine and over the first wireless communication channel, a media access control (MAC) address of the remote device, the MAC address being associated with the second wireless communication channel between the remote device and the wireless-enabled device, wherein the MAC address of the remote device is transmitted from the wireless-enabled device responsive to receiving the one or more signals within a predetermined time window following the establishment of the first wireless communication channel.

25. The device of claim 24, wherein the predetermined time window is calculated from a point at which the wireless-enabled device receives the notification of the establishment of the first wireless communication channel with the remote device.

26. The device of claim 24, wherein the one or more signals configured to trigger the occurrence of the event identifies the MAC address of the remote device to the wireless-enabled device.

27. The device of claim 24, wherein the control engine is further configured to:
  retrieve the MAC address of the remote device from a storage location associated with the wireless-enabled device.

* * * * *